United States Patent Office 3,058,975
Patented Oct. 16, 1962

3,058,975
CELLULOSE CROSS-LINKED ETHER
Marcel Gaschke, Lyndhurst, N.J., assignor to Rayonier Incorporated, Shelton, Wash., a corporation of Delaware
No Drawing. Filed Apr. 1, 1959, Ser. No. 803,340
1 Claim. (Cl. 260—231)

This invention relates to cellulose, and has for its object the provision of a new cellulose polymeric compound which is characterized by having a brilliant yellow color, being strongly fluorescent with green color predominant under ultraviolet light and having good chemical stability. The new compound may be described as a p-xylene cross-linked ether of cellulose, the fluorescent properties of which result from the structure of the polymer.

The invention is based on the discovery that the product resulting from activating cellulose with liquid ammonia, followed by production of a cellulosate by reaction with metallic sodium, and then etherifying with α,α'-dibromo-p-xylene has amazing and unexpected fluorescence. The α,α'-dibromo-p-xylene etherifying agent is believed to effect a cross-linking of the cellulose chains forming a new composition of matter which is understood to be a p-xylyl-bis-ether of cellulose.

One of the amazing properties of the new compound is its stability as evidenced by the fact that it can be xanthated, formed into viscose, spun in an acid regenerating spin bath in a typical viscose process to produce regenerated filaments which possess the original brilliant fluorescence.

The compound, especially the regenerated fibers, may be blended with other fibers to serve as an "optical-bleach" to give the appearance of greater whiteness. Cotton goods such as yarns or fabrics may be treated to form fluorescent products. Other uses include luminous paints, plastics, highway signs, pigments, inks and the like.

The following example illustrates an operation for the production of the new polymer:

A two-liter resin flask is fitted with a glass-sealed mechanical stirrer, a gas inlet tube, and a low temperature condenser joined through a drying tube to a gas bubbler. This reactor is flushed with dry nitrogen and heated with a free flame to remove traces of moisture. One part of dry commercial osterized cellulose is introduced into the flask, and the flask is then immersed in a large Dewar flask and cooled to from −40° C. to −50° C. by means of a Dry Ice-ether mixture. Approximately 125 parts of anhydrous ammonia is condensed in the flask, 0.212 part of sodium metal is added at once and the mixture stirred until the disappearance of blue color (about thirty minutes). 0.244 part of α,α'-dibromo-p-xylene is then added, and the mixture is stirred at a temperature of −45° C. for about five hours, and then left to stand overnight. The cooling mixture is then removed, ammonia permitted to evaporate, the product acidified with a 10% acetic acid solution, and washed with water to remove the acid and vacuum dried. The product obtained is a sulfur-yellow cross-linked cellulose, strongly fluorescent in green, with the color and fluorescence internally bound and unextractable. The new product is strongly fluorescent in either acid or base. The fluorescence persists through xanthation and regeneration in the viscose process. The invention, accordingly, includes the production of regenerated fluorescent cellulose products, such as filaments, by the viscose process. This may be done by treating blends of the new cellulose compound with other cellulose, or the new compound alone, in the well known viscose process to form fluorescent filaments, sheets, or other objects.

I claim:
Strongly fluorescent brilliant yellow fibrous p-xylene cross-linked ether of cellulose, said ether being strongly fluorescent with green color predominating under ultraviolet light.

References Cited in the file of this patent
UNITED STATES PATENTS

| | | |
|---|---|---|
| 2,148,952 | Maxwell | Feb. 28, 1939 |
| 2,157,083 | Peterson et al. | May 2, 1939 |
| 2,163,607 | Lilienfeld | June 27, 1939 |
| 2,294,925 | Milles | Sept. 8, 1942 |

OTHER REFERENCES

JACS, 53, 1931, pp. 2,344 to 2,347.
Cellulosechemie, VII (1926), pp. 137 to 145.